United States Patent

Angioletti et al.

[11] 4,087,223
[45] May 2, 1978

[54] EXTRUSION HEAD FOR THE MANUFACTURE OF HANDRAILS

[75] Inventors: Attilio Angioletti; Aurelio Brollo, both of Milan, Italy

[73] Assignee: Industrie Pirelli S.p.A., Milan, Italy

[21] Appl. No.: 582,364

[22] Filed: May 30, 1975

[30] Foreign Application Priority Data

Jun. 5, 1974 Italy ............... 23603 A/74

[51] Int. Cl.² .............................................. B29F 3/10
[52] U.S. Cl. .................... 425/112; 264/275; 264/279; 425/114; 425/461
[58] Field of Search ............... 425/113, 114, 381, 467, 425/111, 112, 461, 376; 264/133, 274, 261, 263, 266, 275, 277, 279; 156/54, 461, 500; 72/467, 253

[56] References Cited

U.S. PATENT DOCUMENTS

| | | | |
|---|---|---|---|
| 2,149,002 | 2/1939 | Wermine | 264/174 |
| 2,644,983 | 7/1953 | Curtiss | 425/113 |
| 2,698,684 | 1/1955 | Guiney et al. | 72/467 |
| 2,945,390 | 7/1960 | Bush et al. | 425/114 |
| 3,045,281 | 7/1962 | Skobel | 425/113 |
| 3,067,455 | 12/1962 | Reid | 425/113 |
| 3,531,829 | 10/1970 | Skobel et al. | 425/113 |
| 3,909,176 | 8/1975 | Madonini | 425/113 |
| 3,947,172 | 3/1976 | Myers | 425/113 |

*Primary Examiner*—Francis S. Husar
*Assistant Examiner*—Mark Rosenbaum
*Attorney, Agent, or Firm*—Stevens, Davis, Miller & Mosher

[57] ABSTRACT

Extrusion device and the continuous manufacture of a handrail of elastomeric material, C-shaped in cross section.

The extrusion device is provided with separate and distinct openings for the introduction of the various elements of the handrail, and with means which shape continuously said elements and arrange them continuously in mutual correct position into elastomeric material.

2 Claims, 4 Drawing Figures

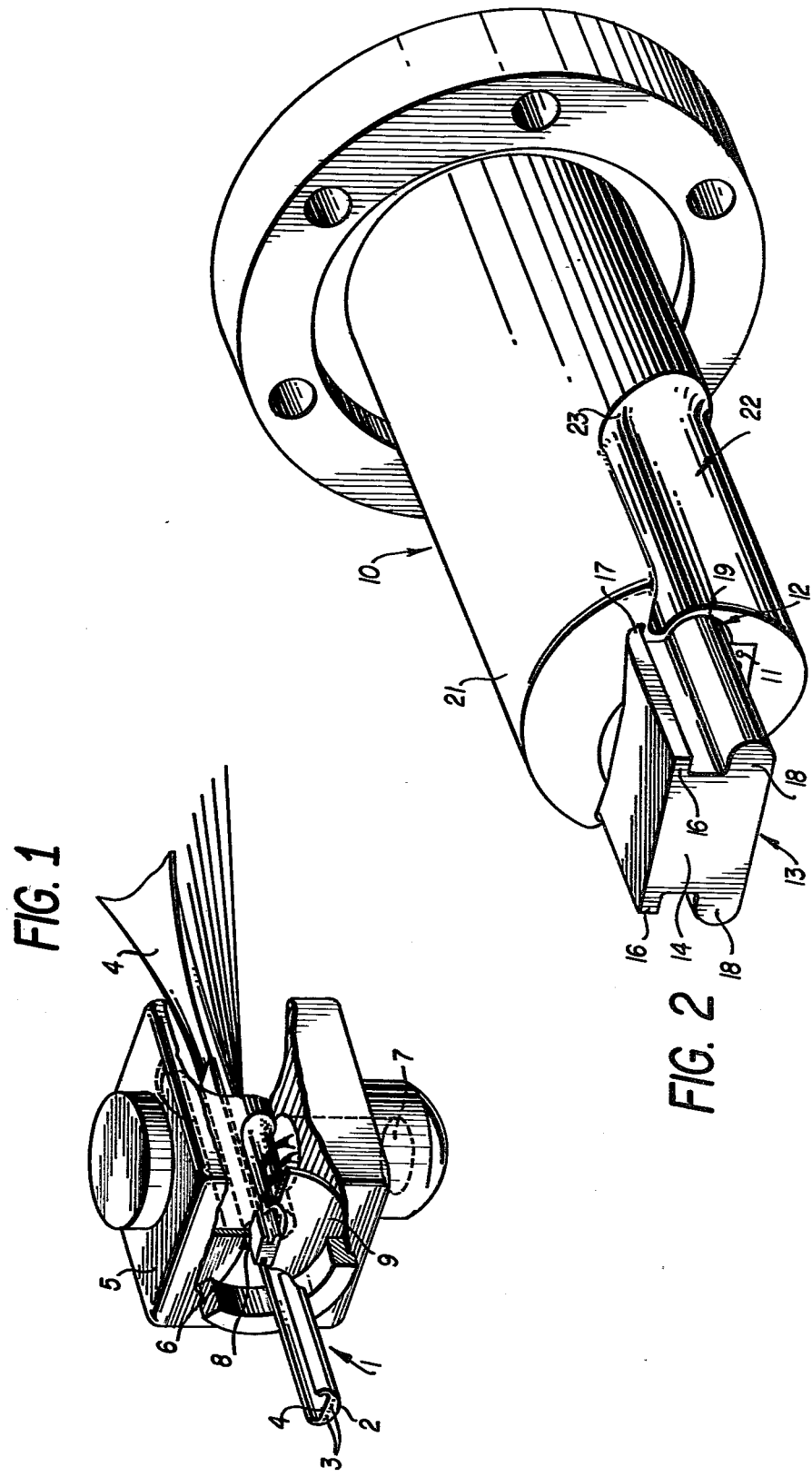

EXTRUSION HEAD FOR THE MANUFACTURE OF HANDRAILS

The present invention concerns an extrusion head for manufacturing handrails for escalators, passenger conveyors and the like.

More particularly, the inventin relates to an extrusion head able to produce continuously a handrail of indefinite length by starting directly from its constituting elements.

Moreover, the invention refers to a handrail obtained by means of the extrusion head also forming the object of the invention itself.

The manufacture of conventional handrails is carried out as follows. The various elements intended to form the handrail, namely a plurality of bands of rubberized fabric and, if desired, a band of cord fabric having the cords arranged along the band axis, are doubled together to obtain a composite flat band having a preestablished length in accordance with the layout it is wished for the handrail. The composite band is moulded in successive portions in a press by means of which it is possible to impart to said band the typical C-shaped cross section peculiar of handrails and, if it is made of elastomeric material, it is also cured in said press.

It follows that the known processes and machines, namely the presses, do not permit to manufacture the handrail in a continuous manner and moreover said processes and machines do not permit a direct production of the handrail by starting from its constituting elements, because it is necessary to prepare at first an intermediate product represented by a composite flat band.

The above involves first of all a high production cost owing to the several operations necessary for the handrail manufacture, and also a low production rate.

Moreover, the use of presses originates drawbacks in the handrail. In fact, to shape as a C the composite band intended to form the handrail, deformations are to be caused in some components of the composite band. Said deformations give often rise to undue relative displacements between the various components of the composite band, so that an identical arrangement of the various elements of the handrail in all the cross sections of its layout is not obtained.

This lacking uniformity of the components of the handrail results in a reduction of the useful life of the same in service conditions.

The present invention aims at eliminating the above indicated disadvantages due to the processes and machines at present used for manufacturing handrails, and at producing handrails in a continuous manner by starting directly from its constituting elements.

A further aim of the invention is that of providing a handrail of low cost and having a layout as large as desired.

Accordingly, the object of the present invention is a process for manufacturing a handrail constituted by a structural shape of elastomeric or plastic material, shaped as a C in cross section, which comprises the steps of: shaping continuously a band of fabric according to the form of the concave surface of the handrail; positioning continuously a plurality of inextensible threads or cords in mutual parallel and coplanar relationship; embedding continuously said threads or cords into an elastomeric or plastic material, imparting simultaneously to the latter the shape of the handrail; and applying continuously the shaped fabric on the concave surface of the latter.

A further object of the invention is an extrusion head for the manufacture of a handrail; which comprises: — an outer casing in which are obtained a through cylindrical cavity and a duct, opening into it, whose axis is perpendicular to the axis of said through cavity, — a shaped mandrel which occupies said through cavity and forms with the inner surface of the latter a hollow space in the portion comprised between the extrusion opening, provided at one end of the through cavity, and the position where the duct opens into the latter, said mandrel having a plurality of through holes whose axes are coplanar and parallel to the axis of said through cavity and — a through opening obtained in the outer casing and constituting the extrusion mouth, having a substantial C shape in cross section, so that the individual threads forming the resistant insertion of a handrail, the fabric covering the concave surface of said handrail and the elastomeric or plastic material forming the handrail body penetrate separately into the extrusion head and are joined together already in shaped condition and only at the extrusion opening where said handrail is originated.

A further object of the present invention is a handrail consisting of a composite structural shape, C-shaped in cross section, which comprises a body completely made of elastomeric or plastic material in which is embedded a plurality of inextensible threads or cords, parallel to one another, a fabric being applied on the whole extension of the concave surface of the structural shape and on the facing ends of the arms.

The present invention will be better understood from the following detailed description, given by way of non-limiting example with reference to the figures of the attached sheet of drawing, in which:

FIG. 1 shows in perspective view the extrusion head with parts partially broken away to illustrate the structure of said extrusion head and a portion of a handrail produced with it;

FIG. 2 shows in perspective view and in enlarged scale a particular of the extrusion head of FIG. 1;

Figure 4:
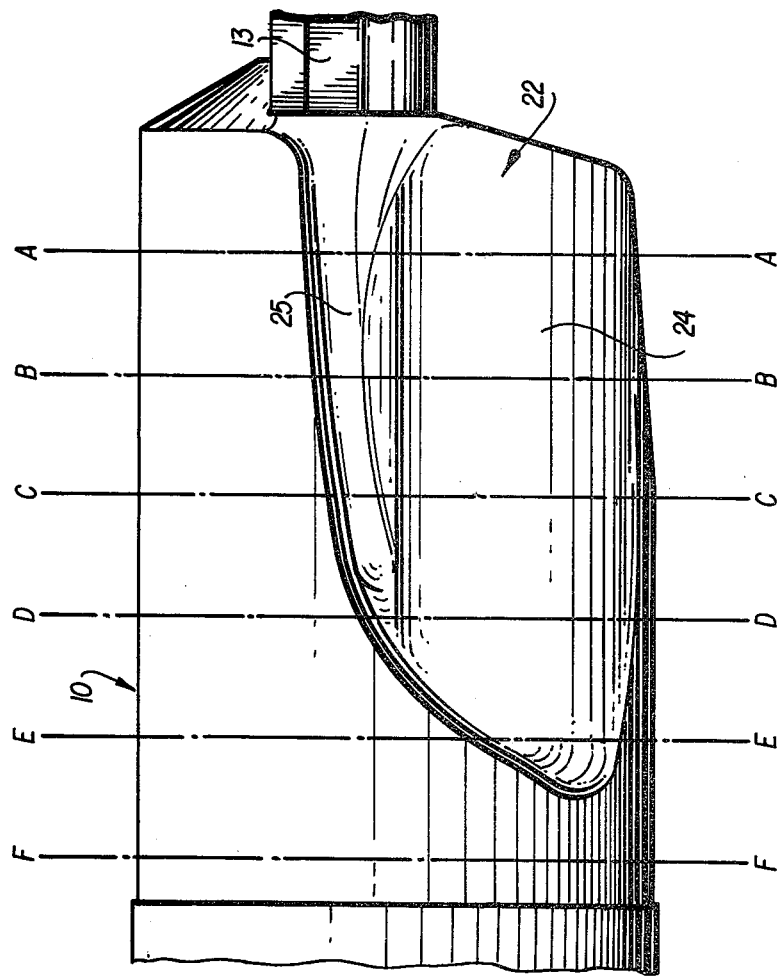
FIG. 4 shows in lateral view a particular of FIG. 2.

The process according to the invention for the manufacture of a handrail for escalators, passenger conveyors and the like comprises the following steps:

— shaping continuously a band of fabric, imparting to it a substantial C shape in cross section, namely a shape deriving from the union of a rectilinear length or core with two arms in the form of half circles at the ends of said core, said arms having their concavities in facing position and being provided with edges, projecting in cantilever fashion from their ends, which are parallel to each other, directed towards the outside and perpendicular to the core;

— positioning continuously a plurality of inextensible threads or cords in mutual parallel and coplanar relationship;

— embedding continuously said inextensible threads or cords into an elastomeric or plastic material, while the elastomeric or plastic material is formed as a structural shape, C-shaped in cross section, by applying simultaneously and continuously the shaped fabric on the concave surface of the structural shape.

The above described process is carried out by means of the device represented in the attached figures.

As it can be seen in FIG. 1, the extrusion head according to the present invention produces a handrail 1, forming one of the objects of said invention, which is constituted by a body 2 of elastomeric or plastic material, having the shape of a C in cross section, in which are embedded a plurality of cords 3, parallel and coplanar with respect to one another, and having its concave surface covered with a fabric 4.

As visible in FIG. 1, said extrusion head comprises an outer casing 5 constituted by a metal die block provided with a through cylindrical cavity 6 and with a duct 7 which opens in said through cylindrical cavity 6.

The axis of the through cylindrical cavity 6 and the axis of the duct are perpendicular to each other. At the end 8 of the cavity there is the extrusion mouth or die, formed into a disc 9, removably fixed at said end 8 to the outer casing 5, in which is present an opening having a shape and size exactly equal to those of the handrail 1.

Figure 3:
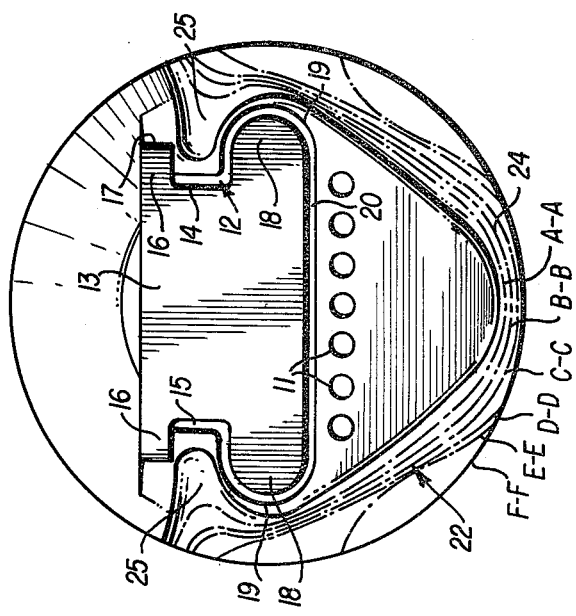
FIG. 3 shows in front view a particular of FIG. 2.

Within the through cylindrical cavtiy 6 there is inserted a shaped mandrel 10, represented in enlarged scale and in perspective view in FIG. 2, and in front view and side view, respectively, in FIGS. 3 and 4.

As it can be seen in FIGS. 2, 3 and 4, the shaped mandrel 10 consists of a block, whose outer surface will be described herebelow. The block or shaped mandrel 10 is provided with a plurality of through holes 11, whose axes are parallel and coplanar to one another, and are parallel to the axis of said mandrel, and with a through opening 12, having substantially an I-shaped section.

A bar 13, substantially I-shaped in section, is inserted in the opening 12, and it has such a length as to protrude for a certain portion from the extrusion mouth (see FIG. 1). The characteristics of the through opening 12 and those of the bar 13 are the following:

The bar 13, I-shaped in cross section, has a core 14 whose width is practically equal to the distance between the facing ends of the C-shaped structure of the handrail to be produced; moreover, said core 14 has a height equal to the thickness of the facing ends of the C-shaped structure of the handrail. On its turn, the core of the through opening 12, I-shaped in cross section, intended to receive the core 14 of the bar 13, also I-shaped in cross section, has a greater size, so that hollow spaces 15 may be created between said cores, having such dimensions as to allow the passage of a fabric.

The arms 16 of the bar 13, I-shaped in section, have a shape and size substantially equal to those of the arms 17 of the opening 12, with the obvious clearances permitting the introduction of said arms 16 in the arms 17.

Moreover, the bar 13 is provided with arms 18, having rounded corners, whose shape and outer dimensions are identical to the shape and the dimensions of the surface of the handrail cavity covered with a covering fabric.

Correspondingly, the arms 19 of the opening 12, intended to receive the arms 18 of the bar 13, have a shape equal to that of the latter arms, but have a greater size, so as to create between them a through hollow space 20, C-shaped in cross section, of such dimensions as to allow the passage of a fabric.

The hollow space 20, C-shaped in cross section, is in direct communication with the hollow spaces 15 at their own ends, so that said hollow spaces 15 constitute a prolongation of said hollow space 20.

As said above, the shaped mandrel 10 consists of a block having a particular surface, which will now be described and which is represented in FIGS. 2, 3 and 4.

In a completely cylindrical surface, a part (and more precisely the part which, when the mandrel is inserted in the through cavity, is comprised between the duct 7, the extrusion mouth and the core 14 of the bar 13) is digged in order to originate a shaped surface 22 and to create a step 23 between the surfaces 21 and 22.

Said surface 22 (see FIGS. 3 and 4) is symmetrical with respect to the plane of symmetry of the bar 13 and, in its general definition, it consists of a generically curved portion 24 and two grooves 25 in the zone corresponding to the core both of the bar 13 and of the through cavity 12, said grooves having progressively increasing depth towards the extrusion mouth obtained in the disc 9.

In particular, the shape of the surface 22 is that represented in FIG. 3, showing the contour lines of said surface.

Said contour lines are indicated with the reference letters A—A, B—B, C—C, D—D, E—E, F—F and they represent the outer profile of the sections of the mandrel 10 which appear respectively on the planes whose traces in FIG. 4 are represented by the lines indicated with the reference letters A—A, B—B, C—C, D—D, E—E, F—F.

As it can be seen by the group of the above cited contour lines, illustrated in FIG. 3, the shaped surface 22 is provided with grooves 25 arranged in the zones adjacent to the arms of the opening 12, and said grooves have a progressively increasing depth towards the end of the mandrel facing the extrusion mouth.

The importance of the above mentioned grooves will clearly appear from the description of the operation of the extrusion head, reported herebelow.

As visible in FIG. 1, the constituting elements of a handrail are simultaneously and continuously introduced in the extrusion head. In particular, the following elements are respectively introduced:

— a band 4 of fabric, which is caused to pass through the hollow space 20, the lateral edges of the band being encased and passing in the hollow spaces 15;
— a plurality of threads or cords 3, which are caused to pass through the holes 11;
— elastomeric or plastic material entering the extrusion head through the duct 7.

The elastomeric or plastic material entered through the duct 7 flows towards the extrusion head by passing through the free space between the surface 22 of the mandrel 10 and the inner surface of the through duct 6, facing said surface 22.

When the elastomeric or plastic material leaves the surface 22, it contains, embedded into it, the threads or cords 3 and the fabric 4, originating a handrail 1 outcoming from the extrusion mouth.

The elastomeric or plastic material which leaves the surface 22, owing to the presence of the grooves 25 and to the fact that said grooves — having a gradually increasing depth towards the extrusion head — impart to the elastomeric material flowing into them a direction of motion which admits a component in a direction perpendicular to the plane of symmetry of the mandrel, exerts on the band of fabric 4, and more precisely on the lateral edges of said band a tensioning action while said edges outcome from the hollow spaces 15; said tensioning action tends to push the band edges against the bar 13, ensuring therefore the elimination of folds on said band.

In other words, the elastomeric or plastic material places under tension the band 4 of fabric in a direction perpendicular to the development of the latter; the consequence of said action is that the band, besides not originating folds, adheres perfectly to the elastomeric or plastic material.

From the above description it can be understood how it is possible to achieve the purposes of the present invention; in fact, the extrusion head according to the invention, is able to join together all the elements constituting the handrail in a single operation and in a continuous manner. Moreover, the elements of the handrail are positioned with respect to one another in an always uniform manner, and this ensures a perfectly uniform and constant production.

Although a preferred embodiment of the invention has been described and illustrated, it is understood that it includes in its scope any possible alternative embodiments accessible to a technician of this field.

We claim:

1. An extrusion head for the manufacture of a handrail comprising a die block having a die with an opening of C shaped form from which the handrail is originated, the opening comprising a curved section at each end thereof and a substantially straight section between the ends thereof, means operatively associated with said die for guiding a plurality of threads or cords to the die, a shaped cavity within said die block for the passage of plastic or elastomeric material from an inlet opening for the latter to the die where the body of the handrail is formed, a hollow space within said die block for feeding a band of fabric, intended to cover the concave surface of the handrail, into the shaped cavity, and two grooves in said shaped cavity to compel the plastic or elastomeric material to apply tension to the edges of said band of fabric in a direction perpendicular to the edges and parallel to the straight section of the opening before the band of fabric reaches the die whereby said band does not originate folds and adheres to the plastic or elastomeric material forming the body of the handrail.

2. An extrusion head for the manufacture of a generally C-shaped handrail, said extrusion head comprising:
an outer casing having a generally cylindrical cavity and a duct defined therein, said duct opening into said cavity and having a longitudinal axis which is perpendicular to the longitudinal axis of the cavity;
a shaped mandrel in said cavity, said mandrel having an inlet end and an outlet end, said mandrel having a generally curved surface which defines a hollow space with the inner surface of the cavity, said mandrel having defined therein:
a plurality of holes, whose longitudinal axes are coplanar and parallel to the longitudinal axis of the cavity, for passage of cords or threads therethrough, and
an opening, I-shaped in transverse cross-section;
a bar, I-shaped in transverse cross-section, in said I-shaped opening, said bar having a core of a width equal to the distance between facing ends of the C-shaped handrail to be produced and a height equal to the thickness of the facing ends of the handrail to be produced and being of smaller transverse cross-sectional area than said I-shaped opening and defining therebetween a C-shaped space for passage of a band of fabric to cover the concave surface of the handrail, said C-shaped space comprising a curved section at each end thereof and a substantially straight section between the ends thereof;
said generally curved surface is symmetrical with respect to the plane of symmetry of said bar and is defined in part by a pair of grooves in the mandrel, each one adjacent the core of the bar, said grooves increasing progressively in depth toward the core of the bar in a direction from said inlet end toward said outlet end so that plastic or elastomeric material fed to said hollow space and said grooves in the mandrel through said duct applies tension to the edges of the band of fabric in a direction perpendicular to the plane of symmetry of the bar and parallel to the straight section of the C-shaped space so that folds are not created in the band and it adheres to the plastic or elastomeric material.

* * * * *